United States Patent [19]

Myers et al.

[11] Patent Number: 4,728,788
[45] Date of Patent: Mar. 1, 1988

[54] POSITION ENCODER APPARATUS

[75] Inventors: Howard M. Myers, Greensboro; Benjamin T. Siler, Stokesdale, both of N.C.

[73] Assignee: Gilbarco, Inc., Greensboro, N.C.

[21] Appl. No.: 687,279

[22] Filed: Dec. 28, 1984

[51] Int. Cl.⁴ .............................................. G01D 5/34
[52] U.S. Cl. .............................................. 250/231 SE
[58] Field of Search ........ 250/231 SE, 237 R, 237 G; 324/175; 356/395

[56] References Cited

U.S. PATENT DOCUMENTS

3,814,934  6/1974  Mesh et al. ................... 250/231 SE
4,544,915  10/1985  Wiene et al. ................. 250/231 SE
4,623,328  11/1986  Hartranft ...................... 250/231 SE Primary Examiner—Eugene R. LaRoche
Assistant Examiner—Steven J. Mottola

[57] ABSTRACT

A shaft encoder for deriving a number of pulses indicative of the extent of rotary shaft motion including a disc having plural relatively narrow opaque regions spaced from each other by relatively wide transparent regions. Light from a pair of sources is directed through the regions toward a pair of light detectors. The detectors and regions are such that under normal operation light from the sources is incident on at least one of the detectors. The wide regions have an extent sufficiently great to prevent them from being clogged by dirt and other debris. In response to neither of the detectors having light incident on them, an indication of a failure of the shaft encoder is provided and operation of an accumulator responsive to the number of light transitions incident on the detectors is prevented. Thereby, a fail-safe apparatus is provided in the event of a failure of any of the light sources, the detectors and circuitry responsive thereto.

26 Claims, 3 Drawing Figures

POSITION ENCODER APPARATUS

FIELD OF THE INVENTION

The present invention relates generally to apparatus for deriving pulses indicative in number to movement of a mechanical member and more particularly to such an apparatus wherein an optical encoder includes plural relatively narrow substantially equi-spaced and equi-length regions spaced from each other by relatively wide substantially equi-spaced and equi-length regions, in combination with a pair of detectors which are arranged with the regions so that under normal operation optical energy from a source means illuminating the detectors is always incident on at least one of the detectors at a particular time via a path including a wide region.

BACKGROUND ART

In Mesh et al, U.S. Pat. No. 3,814,934, commonly owned with the present invention, there is disclosed a shaft encoder including a disc driven by a shaft, the rotary motion of which is indicated by counting pulses. The rotary disc includes relatively narrow transparent slots or regions, spaced from each other by relatively wide opaque regions. Optical energy from a pair of point sources is directed through the transparent regions to be incident on a pair of optical detectors aligned with the sources. The sources, detectors, slots and regions are arranged so that the center lines between adjacent detector-source positions is less than one-half of the separation between adjacent slots, in such a manner as to provide pulses equal in number to the rotation of the shaft driving the disc, and to compensate for angular hysteresis of the shaft to at least 2°.

In normal operation, during most of the time while the disc is rotating, the opaque regions of the disc cause shadows to be cast on both of the detectors simultaneously. During a relatively brief interval, light is transmitted from one of the sources through a slot to the detector aligned with one of the sources. Circuitry responsive to pulses generated by the detectors being illuminated counts the generated pulses to provide an indication of extent of shaft rotation with compensation for the hysteresis effect.

It has been found that there is a tendency for the relatively narrow slots of the prior art encoder transducer to become clogged with dirt and other debris. Such clogging prevents light from being incident on the detectors when the slots pass between the detectors and sources, with obvious detrimental effects on the accuracy of the shaft rotation indication.

It has also been found that certain components in the encoder have a tendency to fail. Light emitting diodes, which form the point light sources, have a tendency to become open circuited and short circuited, in which case no optical energy is derived from them. Phototransistors, which form the light detectors, have a tendency to be become open and short circuited. An open circuit of the phototransistors has the same overall effect as an open or short circuit to the light emitting diodes, while a short circuited phototransistor produces the same effect as a constantly illuminated phototransistor. In addition, driver transistors responsive to the phototransistors have a tendency to become open and short circuited. All of these effects prevent proper derivation of an accurate indication of the extent of shaft rotation because the number of generated pulses is usually one-half of the correct number. In the previous system there is no way for the machine to indicate that any of these malfunctions have occurred. It is also somewhat difficult for an operator to realize that the number of derived pulses is only one-half of what it should be.

In the prior art, there is a relatively high likelihood of phototransistor malfunction due to a phototransistor being open circuited because relatively large voltages are normally maintained across the phototransistors during most of the time power is applied to the unit. The phototransistors have large back bias voltages across the emitter collector paths thereof most of the time because both phototransistors have shadows incident on them for about 90% of the operating time of the unit. When the phototransistors are responsive to light propagating through the slots from the light emitting diodes, relatively large voltage changes occur across them. These malfunctions are a natural consequence of the nature of the prior art encoder, wherein the phototransistors are normally maintained in a shadow, non-conducting, high impedance state. The prior art encoder has also been found to have a relatively slow response time, to limit the maximum speed of a drive shaft which is to be monitored by the encoder.

It is, accordingly, an object of the present invention to provide a new and improved apparatus for deriving a number of pulses indicative of the movement of a mechanical member that drives an encoding transducer.

It is another object of the present invention to provide a new and improved optical position encoder having higher reliability and higher frequency response than prior art encoders.

Another object of the invention is to provide a new and improved mechanical position encoder having a fail-safe mode of operation.

An additional object of the invention is to provide a new and improved optical shaft encoder wherein the encoder is prevented from operating in the event of a malfunction to a light source, light detector and circuitry responsive to the detector.

A further object of the invention is to provide an optical shaft encoder having hysteresis correction and opaque and transparent regions arranged so that the tendency for clogging of the transparent regions is substantially prevented.

A further object of the invention is to provide a new and improved optical shaft encoder having hysteresis correction and fail-safe features in the event of a failure of light sources, light detectors, and circuitry responsive to the light detectors.

DISCLOSURE OF THE INVENTION

In accordance with the present invention there is provided an apparatus for deriving pulses indicative in number to the movement of a mechanical member. The apparatus comprises optical energy source means, a pair of detectors for energy from the source means and an encoder transducer adapted to be mounted for movement with the mechanical member. The encoder transducer includes plural relatively narrow substantially equi-spaced and equi-length regions spaced from each other by relatively wide substantially equi-spaced and equi-length regions so that as the encoder transducer moves in response to movement of the mechanical member, optical energy from the source means is prevented from reaching the detectors by the narrow regions to cast shadows on the detectors and optical energy from the source means is incident on the detectors via paths including the wide regions. The narrow and wide regions and detectors are positioned, and the field of view of the detectors in response to the optical energy are such that under normal operation optical energy from the source means is always incident on at least one of the detectors at a particular time. The wide regions have an extent sufficiently great to prevent them from being clogged by dirt and other debris. Because at least one of the detectors is, in normal operation, always responsive to optical energy propagating via the wide regions, it is possible to easily detect a failure in the system due to a malfunction of any of: the optical energy source means, either of the detectors, and the circuitry driven by the detectors. This is in contrast to the prior art arrangement wherein both detectors are normally in a shadow, which prevents facile detection of a failure to the light source, detectors and circuitry driven by the detectors.

To derive an indication that the apparatus has failed, circuit means is provided to respond to both of the detectors simultaneously deriving signals indicative of no optical energy from the source means being incident thereon. Because the wide regions normally enable optical energy to be incident on at least one of the detectors, both detectors can simultaneously derive signals indicative of no optical energy being incident thereon only in the event of a failure to the source means or an open circuit of the detectors. The circuit means includes an R-S flip-flop that detects both detectors simultaneously detecting a shadow condition by deriving a pair of like valued signals but which toggles during normal operation of the device, i.e., both detectors being illuminated most of the time and the detectors alternately having a shadow cast on only one of them for a brief interval. In response to the flip-flop deriving a pair of like valued signals lock up circuitry prevents further operation of the apparatus and signals shut down for the mechanical drive member. For many applications, such as gasoline dispenser pump indicators, this is a highly desirable and necessary requirement.

In the preferred embodiment, to provide very high reliability, each detector illuminates a phototransistor having an emitter collector path that is conducting and non-conducting in response to the phototransistor being illuminated and in a shadow, respectively. The emitter collector paths of the two detectors are connected in parallel between a pair of power supply terminals and have a common collector load resistor connected to one of the power supply terminals. Thereby, the emitter collector voltages of both paths remain relatively low during normal operation even when the emitter collector path of one of the phototransistors is non-conducting. A separate emitter output circuit for each of the phototransistors derives a signal indicative of the amount of optical energy incident on the respective phototransistor. Thereby, the emitter output circuit for each phototransistor derives a bi-level signal having relatively high and low current values in response to the associated phototransistor having light incident and not incident on it. Because a relatively low voltage is always maintained across the emitter collector paths of the phototransistors and the phototransistors essentially function as current switches, the likelihood of the phototransistors failing is materially reduced.

A further feature of the invention is that an indicator for the extent of movement of the mechanical member cannot be incremented in response to a malfunction which creates the same effect as a photodetector being constantly illuminated by optical energy. If the mechanical member is a shaft of a gasoline dispensing pump, for example, and the encoder is an encoder disc, such a malfunction prevents operation of an indicator for the amount of gasoline. Therefore, an operator can instantly determine that the apparatus is not correctly functioning and can be instructed to disable the mechanical member in such an event. Such a result is achieved as a result of the circuit connections previously mentioned, as well as connections of a logic network responsive to the common emitter transistor drivers.

In a preferred embodiment, the logic network includes an R-S flip-flop having first and second inputs respectively responsive to outputs of the first and second driver transistors so that a pair of like binary levels are simultaneously derived by the flip-flop in response to the first and second driver transistors both simultaneously deriving outputs associated with no optical energy being incident on the first and second phototransistors; different binary levels are derived by the flip-flop in response to all other combinations of the outputs of the two driver transistors. A binary level comparator, e.g., an exclusive NOR gate, responds to the outputs of the flip-flop to derive an output signal having first and second different binary values in response to the outputs of the flip-flop being respectively the same and different. First and second gate circuits respectively have first inputs responsive to outputs of the flip-flop. Each gate circuit has a second input responsive to the output signal of the comparator. The gate circuits derive a first binary signal value in response to the first and second inputs thereof simultaneously having the same first level and derive a second binary signal level in response to the first and second inputs thereof simultaneously having different levels and the same second level, e.g., the gate circuits are NOR gates.

The combination of the wide transparent regions and the flip-flop enables hysteresis to be attained for an angle equal approximately to the angular length of the opaque, narrow regions. If the encoder comes to rest at a position so that both detectors are illuminated, hysteresis effects of the encoder and its drive mechanism have no affect on the number of derived pulses because the detectors only respond to an interruption of optical energy on a detector. If the encoder comes to rest so one detector is in a shadow, there is a hysteresis compensation equal to the width of a narrow opaque region.

The output of one of the gate circuits is coupled to an accummulator of a microprocessor, which drives a display for indicating the amount of movement of the mechanical member. If the display indicates no movement of the mechanical member when in fact an operator realizes that the mechanical member is moving, the operator is provided with an indication that the apparatus is malfunctioning in a manner which has the same effect as optical energy always being incident on one of the detectors. The outputs of the two gate circuits are also applied to a binary comparator, such as an exclusive OR or exclusive NOR gate, of the microprocessor. In response to the outputs of the gate circuits simultaneously being the same, as occurs only when there is a malfunction which effectively is the same as one of the photodetectors constantly being responsive to a shadow, the microprocessor comparator decouples the microprocessor accumulator from the outputs of the gate circuit and signals shut down for the mechanical member and sets the indicator to indicate a failure of the mechanical member.

Because of the low current levels coupled by the phototransistors to the driver transistors, the circuitry of the present invention operates at a rate that is three times faster than that of the prior art circuit, utilized with the apparatus described in Mesh et al, U.S. Pat. No. 3,814,934. This enables the present invention to monitor high speed movement of the mechanical member. For practical gasoline dispensing pumps, the speed of response of the present apparatus is such that the apparatus imparts no limits to the maximum pumping speed of gasoline fuel fed by the dispenser into an automotive vehicle.

The above and still further objects, features and advantages of the present invention will become apparent upon consideration of the following detailed description of one specific embodiment thereof, especially when taken in conjunction with the accompanying drawings.

DETAILED DESCRIPTION OF THE DRAWING

Figure 1:
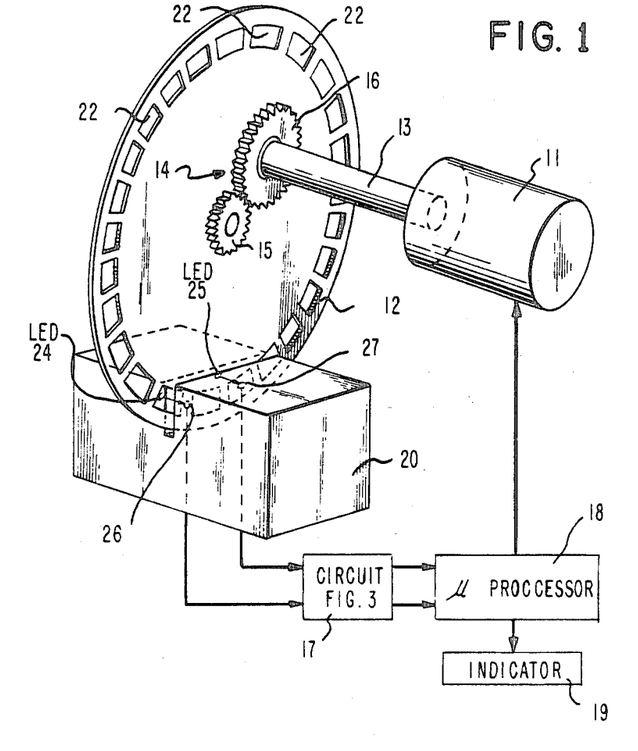
FIG. 1 is a perspective view of an encoder disc and a drive mechanism therefor in accordance with a preferred embodiment of the invention.

Reference is now made to FIG. 1 of the drawing wherein the invention is illustrated in combination with a gasoline dispenser pump 11 that drives optical encoder disc 12 by way of pump output shaft 13 and reduction gear 14, including a relatively small diameter gear 15 carried by shaft 13 and a relatively large diameter gear 16 carried by shaft 12. Encoder disc 12 is arranged so that, for each turn of shaft 13, detector components in housing 20 astride the encoder disc supplies a predetermined number of pulses to circuit 17, illustrated in detail in FIG. 3. Circuit 17 responds to pulses derived as a result of rotation of encoder disc 12 to supply a pair of inputs to microprocessor 18, of a type included in prior art gasoline dispenser pumping apparatus.

In normal operation, microprocessor 18 responds to the output of circuit 17 to drive visual alpha-numeric indicator 19 to indicate the amount of gasoline which has been dispensed during pumping operation of pump 11. In response to certain signal conditions at the outputs of circuit 17, microprocessor 18 signals indicator 19 to display a malfunction indication. The malfunction is indicated by indicator 19 displaying a special alpha sequence, such as "pump out of order" or "XXX". For other malfunction situations of the apparatus for monitoring the rotation of encoder disc 12, circuit 17 does not supply pulses to microprocessor 18 even though pump shaft 13 is turning. An operator of the gasoline dispenser pumping system thereby realizes, under these circumstances, that a malfunction has occurred. In the event of a malfunction, it is merely necessary for a technician to remove circuit 17 and housing 20. Thus, the apparatus of the present invention provides a fail-safe structure for the sources and detectors in housing 20 and of circuit 17.

Figure 2:
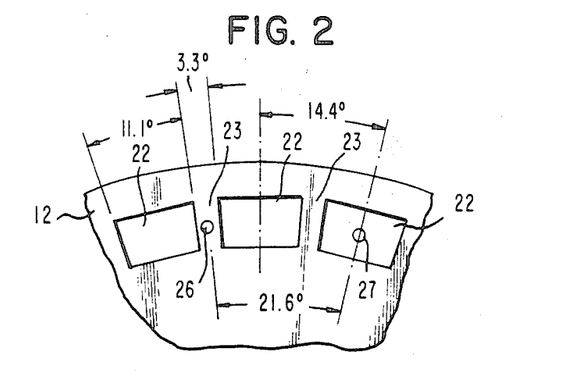
FIG. 2 is an exploded view of a portion of the disc illustrated in FIG. 1, in combination with a pair of detectors for optical energy.

The fail-safe feature of the present invention is attained by forming equi-spaced, equi-length relatively long transparent regions 22 in proximity to the periphery of disc 12. Transparent regions 22 are spaced from each other by relatively short equi-spaced, equi-length opaque regions or spokes 23. In one preferred embodiment, twenty-five transparent regions 22 are spaced from each other by twenty-five opaque regions 23 in proximity to the periphery of disc 12. As best illustrated in FIG. 2, there is a 14.4° center line spacing between adjacent pairs of transparent regions 22, which is equal to the center line distance between adjacent opaque regions 23. Each of the transparent regions 22 and each of the opaque regions 23 respectively has an arcuate length of approximately 11.1° and 3.3° along a circle that is spaced from the center of disc 12 by a distance equal to the mid point between the inner and outer edges of transparent regions 22. The relatively wide spacing of transparent regions 22 prevents the accumulation of dirt and other debris in the transparent regions, in contrast to the prior art discs which have relatively narrow transparent regions tending to become filled with dirt and other debris.

The fail-safe feature of the invention is also attained by providing a pair of properly positioned optical energy sources and optical detectors in housing 20. The optical energy light sources are constantly activated, point source, light emitting diodes 24 and 25, positioned on one side of disc 12. The light detectors are phototransistors 26 and 27 respectively aligned with light emitting diodes 24 and 25, on the other side of disc 12. Light emitting diodes 24 and 25 and phototransistors 26 and 27 are arranged in housing 20 so that phototransistor 26 responds only to light propagating through transparent region 22 from light emitting diode 24, while phototransistor 27 responds only to optical energy propagated via regions 22 from light emitting diode 25.

Light emitting diodes 24 and 25 are spaced from each other and phototransistors 26 and 27 are spaced from each other so that when a shadow is cast on one of the phototransistors by an opaque region 23 the other phototransistor is responsive to optical energy propagating through the center of one of transparent regions 22. For the stated preferred embodiment, such a result is achieved by arcuately spacing light emitting diode 24 and its associated phototransistor 26 21.6° from light emitting diode 25 and its associated phototransistor 27. Thus, when disc 12 is at a position so that a shadow is cast by an opaque region 23 on phototransistor 26, light propagates from light emitting diode 25 through the transparent region 22 once removed from the transparent region immediately adjacent the opaque region which is casting the shadow on phototransistor 26. The stated arrangement of the light sources and detectors in housing 20 and of transparent and opaque regions 22 and 23 enables the fail-safe features of the present invention to be achieved.

Figure 3:
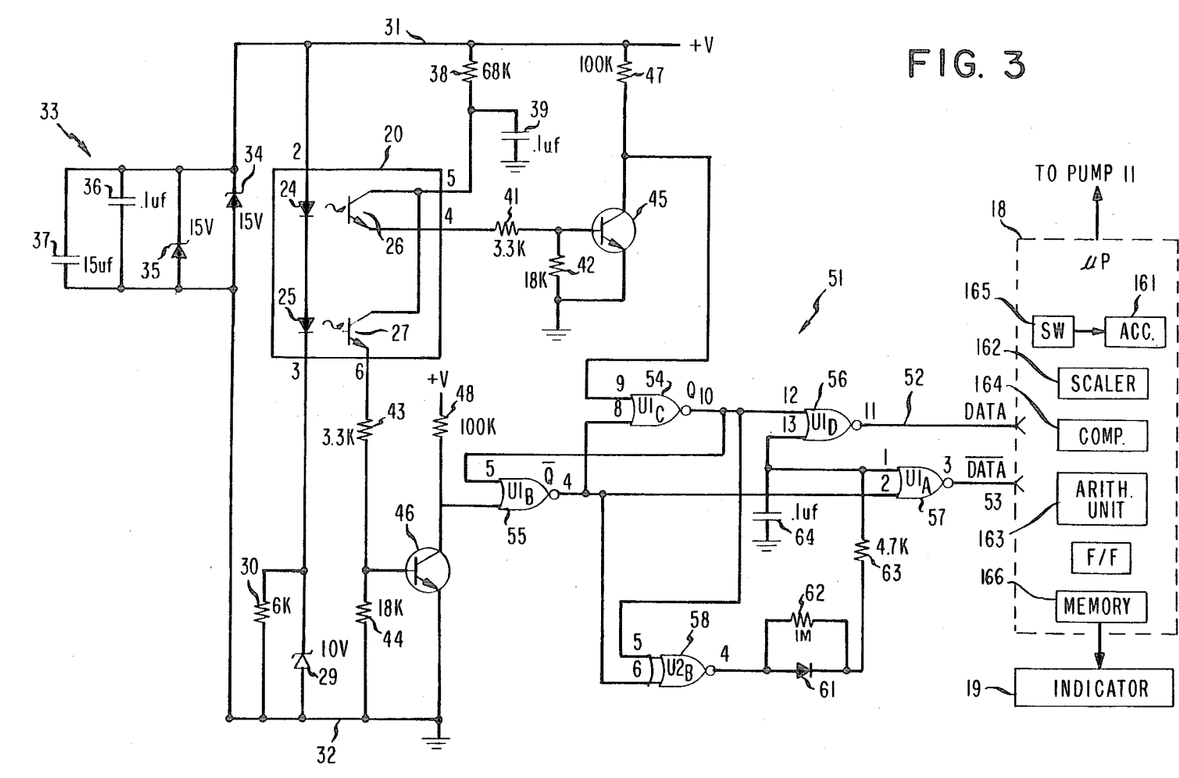
FIG. 3 is a circuit diagram of electronic apparatus including optical energy source means, detectors and circuitry driven thereby to provide a fail-safe result.

Consideration is now given to the circuitry illustrated in FIG. 3 which includes light emitting diodes 24 and 25 and phototransistors 26 and 27 in housing 20, as well as circuitry responsive thereto for deriving output signals which are supplied to microprocessor 18. To maintain the light output of light emitting diodes 24 and 25 substantially constant under virtually all operating conditions, light emitting diodes 24 and 25 are connected in series with each other and a regulator including zener diode 29, shunted by resistor 30. Overvoltage protection for the potential between terminals 31 and 32 is provided by shunt network 33 including zener diodes 34 and 35 and capacitors 36 and 37, all connected in parallel with each other across the supply terminals.

Optical energy from light emitting diodes 24 and 25 illuminates phototransistors 26 and 27, having emitter collector paths connected in parallel with each other between terminals 31 and 32. The collectors of transistors 26 and 27 are connected to power supply terminal 31 by way of load resistor 38, shunted to ground by smoothing capacitor 39. The emitters of transistors 26 and 27 are separately connected to ground terminal 32 by separate load circuits, such that the emitter of transistor 26 is connected via series resistors 41 and 42 to ground, while the emitter of transistor 27 is connected via series resistors 43 and 44 to ground. The values of resistors 41 and 43 are identical, as are the values of resistors 42 and 44. Thereby, equal voltages are developed at the terminals between resistors 41 and 42 and resistors 43 and 44 while phototransistors 26 and 27 are simultaneously illuminated.

Because the emitter collector paths of transistors 26 and 27 are connected in parallel and at least one of the phototransistors is normally illuminated, the voltages at the collectors of the phototransistors are always substantially constant, at a relatively low level. This enhances reliability of phototransistors 26 and 27 because the emitter collector paths thereof are not subjected to substantial bias voltages. Phototransistors 26 and 27 effectively function as current switches to supply bilevel currents to the emitters thereof, so that relatively high currents flow through the emitters of the phototransistors when they are illuminated by light from light emitting diodes 24 and 25 and substantially no current flows through the emitters of the phototransistors when no optical energy is incident thereon.

The bilevel currents at the emitters of phototransistors 26 and 27 are converted into bilevel voltages by the voltage divider networks including resistors 41–44. The voltages at the common terminals of resistors 41 and 42 and of resistors 43 and 44 are respectively applied to the bases of NPN bipolar driver transistors 45 and 46, connected in the common emitter mode. The collectors of transistors 45 and 46 are connected to power supply terminal 31 by way of load resistors 47 and 48, respectively. During normal operation, in response to optical energy being incident on phototransistors 26 and 27, transistors 45 and 46 are respectively forwarded biased, causing the collectors of transistors 45 and 46 to be substantially at ground voltage. In response to a shadow being cast on phototransistors 26 and 27, transistors 45 and 46 are respectively back biased, causing the voltages at the collectors thereof to be essentially the voltage of power supply terminal 31.

By appropriate selection of the values of resistors 38 and 41–44, as indicated on the drawing, the maximum emitter collector voltage of transistors 26 and 27 is about one volt. A relatively low leakage current of approximately 39 microamperes is required to forward bias either of bipolar transistors 45 or 46 because of the low emitter collector voltages of transistors 26 and 27. The low leakage current required to forward bias transistors 45 and 46 is associated with an impedance that is 130 times lower than the input impedance of driver transistors of the prior art circuit, thereby enhancing the operating speed of the present invention.

The voltage levels at the collectors of transistors 45 and 46 are coupled to logic network 51 which supplies microprocessor 18 with bilevel output pulses via leads 52 and 53. During normal operation, each pulse supplied to lead 52 is coupled to microprocessor 18 to indicate the extent of rotation of encoder disc 12 and, therefore, the amount of gasoline dispensed by pump 11. Under normal operation, complementary pulses are applied to leads 52 and 53 by network 51. If, however, there is a malfunction in the apparatus of FIG. 3 due to no light being emitted by either of light emitting diodes 24 and 25, (due to a short circuit or open circuit of either of the light emitting diodes), an open circuit of phototransistor 26 or 27, or an open circuit bipolar transistor 45 or 46, all of which are effectively the same as one of the light emitting diodes malfunctioning, the levels on leads 52 and 53 are the same.

If there is a malfunction due to one of phototransistors 26 or 27 being short circuited, or one of bipolar transistors 45 or 46 being short circuited, which has a much lower probability than the stated malfunctions of phototransistors 24 and 25, open circuiting of phototransistors 26 and 27, or open circuiting of bipolar transistors 45 or 46, all of which are effectively the same as optical energy being incident on one of the phototransistors, no pulses are supplied to leads 52 and 53 even though pump 11 is dispensing gasoline. Microprocessor 18 responds to the pulses on lead 52 to activate indicator 19 to provide an indication of the rotation of shaft 13. If there is a malfunction having the same effect as one of phototransistors 26 or 27 being permanently inoperative, microprocessor 18 responds to the like levels on leads 52 and 53 to activate indicator 19 to indicate a failure. If there is a failure having the same effect as one of phototransistors 26 or 27 being constantly illuminated, no pulses are supplied by leads 52 and 53 to microprocessor 18 even though pump 11 is operating, indicator 19 does not change and continues to display all zeros even though the pump is properly operating. This condition of indicator 19 enables an operator to realize that the system is incorrectly operating and advise him to shut down pump 11.

To these ends, network 51 includes NOR gates 54 and 55, each having one input respectively responsive to the voltages at the collectors of transistors 45 and 46. A remaining input of each of NOR gates 54 and 55 is cross coupled to the output of the other NOR gate, to form an R-S flip-flop. As is well known, an R-S flip-flop responds to the inputs thereof so that if zero, i.e., ground, levels are simultaneously at the collectors of transistors 45 and 46, the outputs of flip-flops 54 and 55 are in opposite binary states, such that the outputs of NOR gates 54 and 55 are respectively simultaneously zero and one or are respectively simultaneously one and zero. In response to binary zero and one levels simultaneously being at the collectors of transistors 45 and 46 NOR gates 54 and 55 respectively derive binary one and zero levels; in response to the signals at the collectors of transistors 45 and 46 being simultaneously one and zero, the outputs of NOR gates 54 and 55 are respectively simultaneously zero and one. If, however, binary one levels are simultaneously derived at the collectors of transistors 45 and 46, as occurs only in response to shadows being effectively incident on both of phototransistors 26 and 27, binary zero levels are simultaneously derived at the outputs of NOR gates 54 and 55.

The signals at the output terminals of NOR gates 54 and 55 are supplied to first input terminals of NOR gates 56 and 57, respectively. A second input of each of NOR gates 56 and 57 is driven in parallel by a binary signal at the output of exclusive NOR gate 58, having first and second inputs respectively responsive to the binary output signals of NOR gates 54 and 55. The output of exclusive NOR gate 58 is coupled to the second inputs of NOR gates 56 and 57 by way of a network including isolating diode 161, shunted by resistor 162; the parallel combination of diode 161 and resistor 162 is connected in series with current limiting resistor 163, shunted by filter capacitor 164.

In normal operation, i.e., when there is no component in the circuitry including light emitting diodes 24 and 25, phototransistors 26 and 27 and bipolar transistors 45 and 46 which produces the same effect as both of the phototransistors having shadows cast thereon, different bilevel voltages are derived by NOR gates 54 and 55. Different levels are also derived by gates 54 and 55 in response to phototransistors 26 and 27 both simultaneously effectively being irradiated by optical energy from light emitting diodes 24 and 25. Exclusive NOR gate 58 derives a low, binary zero level in response to the different output levels of NOR gates 54 and 55.

The low, binary zero level derived by exclusive NOR gate 58 causes NOR gates 56 and 57 to function as inverters in response to the binary levels at the outputs of NOR gates 54 and 55, respectively. Thus, during normal operation when the output of exclusive NOR gate 58 is a low level, binary zero and one levels derived by NOR gates 54 and 55 are respectively derived on at leads 52 and 53 as binary one and zero levels, while binary zero and one levels at the outputs of NOR gates 54 and 55 are reflected as binary one and zero levels on leads 52 and 53.

During normal operation each time an opaque region 23 causes a shadow to be cast on either of phototransistors 26 or 27 there is a change in the binary level at the outputs of NOR gates 54 and 55, except possibly the first time that an opaque region 23 interrupts the optical energy incident on one of phototransistors 26 or 27. In particular, when power is initially applied to the circuit usually both of phototransistors 26 and 27 are illuminated. This causes both of bipolar transistors 45 and 46 to be forward biased, whereby there is a relatively low level at the collectors of transistors 45 and 46, resulting in the ambiguous situation of a binary zero being derived at the output of NOR gate 54 while a binary one is derived at the output of NOR gate 55; alternatively a binary one is derived at the output of NOR gate 54 while a binary zero is derived at the output of NOR gate 55.

When the first opaque region 23 passes between one of the light emitting diodes and the corresponding phototransistor there is a 50% probability of NOR gates 54 and 55 changing state. To consider a specific example, assume that initially NOR gates 54 and 55 are respectively set to the zero and one states in response to phototransistors 26 and 27 being simultaneously illuminated when power is initially applied to the circuit. Next assume that transparent region 23 passes between light emitting diode 24 and phototransistor 26 before a transparent region passes between light emitting diode 25 and phototransistor 27. This causes transistor 45 to be back biased while transistor 46 is forward biased; i.e., the conducting state of transistor 45 is changed, but there is no change in the conducting state of transistor 46. The binary one, positive voltage level at the collector of transistor 45 and the binary zero level at the collector of transistor 46 cause NOR gates 54 and 55 to remain in the same condition that they were in when power was initially applied to the circuit. If, however, transparent region 23 were to intercept the optical energy projected by light emitting diode 25 on phototransistor 27, transistors 45 and 46 would respectively be forward and back biased, causing low and high binary levels to be respectively applied to NOR gates 54 and 55. This combination of inputs to NOR gates 54 and 55 would cause the NOR gates to change state from the initial zero and one outputs thereof, to one and zero output levels.

As disc 12 continues to rotate, each time a shadow is cast on one of phototransistors 26 or 27 a change in binary level is derived at the outputs of NOR gates 54 and 55. Consider, for example, the situation immediately after the first blockage of optical energy between light emitting diode 24 and phototransistor 26 for the initial condition of NOR gates 54 and 55 deriving zero and one output levels. Gates 54 and 55 continue to derive such levels while both phototransistors 26 and 27 are illuminated. When a transparent region passes between light emitting diode 25 and phototransistor 27, the high level at the collector of transistor 46 causes a low level at the output of NOR gate 55. The low level at the output of NOR gate 55 causes a high level at the output of NOR gate 54. Thus, there is a change in state of the binary levels on leads 52 and 53. NOR gates 54 and 55 stay in this state while phototransistors 26 and 27 are both illuminated in response to transparent regions 22 simultaneously passing between light emitting diode 24 and phototransistor 26 and between light emitting diode 25 and phototransistor 27. This is because of the storage nature of the cross coupled NOR gates 54 and 55.

As encoder disc 12 continues to rotate so that a shadow is cast on phototransistor 26 while phototransistor 27 is illuminated, by virtue of regions 23 and 22 being respectively in front of phototransistors 26 and 27, bipolar transistor 45 becomes back biased while bipolar transistor 46 remains forward biased. Thereby, binary one and zero levels are respectively applied to the inputs of NOR gates 54 and 55. NOR gate 54 responds to the change in the signal coupled to it at the collector of transistor 45, whereby the output of NOR gate 54 switches from a binary one to a binary zero level. The change in state at the output of NOR gate 54 is coupled to NOR gate 55, whereby the output of NOR gate 55 changes state from a binary one to a binary zero. Thus, each time a shadow is cast on one of photodetectors 26 or 27 by an opaque region 23 of encoder disc 12 there is a corresponding change in state on leads 52 and 53.

The changes in state on one of leads 52 or 53 are coupled to accumulator 161 in microprocessor 18 to indicate the number of turns of shaft 13, hence the quantity of pumped gasoline. Microprocessor 18 responds to the signal in accumulator 161 to drive indicator 19 via binary scaler 162 to indicate the quantity of pumped gasoline. In addition, the signal stored in accumulator 161 is supplied to arithmetic unit 63 within microprocessor 18 to enable an indication of the price of the pumped gasoline to be ascertained by multiplying the value in the accumulator by the price per gallon of the gasoline; the resulting product indicating signal is supplied to an indicator (not shown).

In the event of a malfunction having the same effect as one of light emitting diodes 24 or 25 being inoperative, the driver transistor 45 or 46 associated with the effectively inoperative light emitting diode becomes back biased and a high voltage level is continuously derived at the collector thereof. When the other phototransistor becomes shadowed, the bipolar transistor associated with the other phototransistor also becomes back biased. The simultaneous back biasing of bipolar transistors 45 and 46 causes binary one levels to be coupled to the inputs of NOR gates 54 and 55, whereby binary zeros are simultaneously derived at the outputs of NOR gates 54 and 55. The resulting binary one output of exclusive NOR gate 58, in combination with the low pass filter network including diode 161, resistors 162 and 163 and capacitor 164, causes NOR gates 56 and 57 to derive binary zero levels for a significant time interval, even if disc 12 is rotating at relatively high speed. The simultaneous derivation of binary zero levels on leads 52 and 53 is detected by binary comparator 164, formed by an exclusive OR gate in microprocessor 18. Binary comparator 164 derives a binary one signal in response to the inputs thereof being the same, to open switch 165 between data lead 52 and accumulator 161. The binary one output signal of comparator 164 resets accumulator 161 to zero and sets a flag in memory 166 of microprocessor 18. The flag causes indicator 19 to display an alpha malfunction indication.

If there is a failure having the same effect as one of phototransistors 26 or 27 being constantly illuminated, no transitions are derived on leads 52 and 53. If such a malfunction occurs, a binary zero level is constantly applied to one of the inputs of NOR gates 54 or 55. For example, assume that phototransistor 26 is short circuited, whereby the voltage at the collector of transistor 45 is maintained at a constant low level. The low level at the collector of transistor 45 is constantly applied to one of the inputs of NOR gate 54, whereby the output of NOR gate 54 remains at a binary one level. Transitions in the level at the collector of transistor 46 in response to phototransistor 27 being sequentially exposed to radiation from source 25 and having a shadow cast on it have no effect on the operation of the flip-flop including NOR gates 54 and 55. This is because an R-S flip-flop does not change state when simultaneously supplied with two binary zero levels. Hence, there are no transitions to be counted on lead 52 by accumulator 161. An operator is thereby apprised of the fact that there is a malfunction in a package including circuit 17 or a component in housing 20. The operator responds to this malfunction by deactivating the gasoline dispenser of pump 11. This is a relatively economic approach to providing fail-safe operation for a component that produces the same effect as optical energy constantly being incident on one of phototransistors 26 or 27, while providing a positive indication of the same effect as one of the phototransistors being inoperative.

The fail-safe operation of the present invention is also responsive to a failure of either of NOR gates 54 or 55. If either of the NOR gates malfunctions so that it is effectively short circuited, whereby a binary zero level is derived at the output thereof, the same effect occurs as results when the light emitting diode which ultimately drives the NOR gate is inoperative. If the NOR gate 54 or 55 is open circuited so that a high voltage is constantly derived at the output thereof, the effect is the same as a short circuit for the associated phototransistor or driver transistor.

Hysteresis compensation is inherently provided by the present invention because of the arrangement of wide transparent regions 22, narrow opaque regions 23, the positions of light emitting diodes 24, 25, phototransistors 26, 27 and the connections of circuit 17. If, for example, the initial, stationary position of disc 12 is such that phototransistors 26 and 27 are both illuminated, the initial turning of the disc does not cause any change in the outputs of phototransistors. If disc 12 is initially positioned so, one of the phototransistors is illuminated, e.g. phototransistor 26, while a shadow is cast on the other phototransistor, e.g. phototransistor 27, by one of opaque regions 23, there must be at least about 1.5° rotation of disc 12 prior to a change in level supplied by lead 52 to accumulator 161. Hence, a 1.5° hysteresis compensation is provided.

While several discrete components are illustrated in microprocessor 18, it is to be understood that these discrete components are part of conventional registers and the like in an integrated circuit forming the microprocessor. Microprocessor 18 is programmed, in a manner obvious to one skilled in the art, to perform the stated functions attributed to it. Alternatively the operations described in connection with microprocessor 18 can be performed by a dedicated circuit.

While there has been described and illustrated one specific embodiment of the invention, it will be clear that variations in the details of the embodiment specifically illustrated and described may be made without departing from the true spirit and scope of the invention as defined in the appended claims.

We claim:

1. Apparatus for deriving pulses indicative in number of the movement of a mechanical member comprising optical energy source means, a pair of detectors for energy from the source means, an encoder transducer adapted to be mounted for movement with the member, the encoder transducer including plural relatively narrow substantially equi-spaced and equi-length regions spaced from each other by relatively wide substantially equi-spaced and equi-length regions so that as the encoder transducer moves in response to movement of the member, optical energy from the source means is prevented from reaching the detectors by the narrow regions to cast shadows on the detectors and optical energy from the source means is incident on the detector via a path including the wide regions, the detectors and regions being positioned and the field of view of the detectors in response to the optical energy of the source means being such that under normal operation optical energy from the source means is always incident on at least one of the detectors at a particular time and is incident on both of the detectors at other times, the wide regions having an extent sufficiently great to prevent them from being clogged by dirt and other debris.

2. The apparatus of claim 1 further including circuit means responsive to pulses derived by the detectors in response to movement of the transducer causing optical energy from the source means to be incident on the detectors and to be blocked from the detectors, said circuit means including means for deriving an indication that the apparatus has failed in response to both of the detectors simultaneously deriving signals indicative of no optical energy from the source means being incident thereon.

3. The apparatus of claim 2 wherein the circuit means further includes means responsive to pulses derived by at least one detector for deriving data pulses to be accummulated to indicate the extent of movement of the mechanical member, and means for preventing coupling of the data pulses in response to the indication that the apparatus has failed.

4. The apparatus of claim 3 wherein the means for preventing coupling data pulse includes non-resettable blocking circuit means.

5. The apparatus of claim 1 wherein each detector includes a phototransistor having an emitter collector path, the emitter collector paths being connected in parallel between a pair of power supply terminals and having a common collector load resistor connected to one of the power supply terminals so that the emitter collector voltages of both paths remain relatively low under normal operation even when one of the phototransistors has a high emitter collector impedance in response to said one transistor not being illuminated by optical energy from the source means, and a separate emitter output circuit for each of said phototransistors for deriving a signal indicative of the amount of optical energy incident on the respective phototransistor.

6. The apparatus of claim 5 further including a separate common emitter driver transistor respectively responsive to current coupled to each emitter output circuit, wherein the indication deriving means includes logic circuit means responsive to an output of each driver circuit for deriving the failure indication in response to any of: a failure of the optical energy source means, either of the phototransistors being open circuited, and either of the driver transistors being open circuited.

7. The apparatus of claim 6 wherein the logic circuit means includes means for deriving the failure indication in response to the driver transistors simultaneously deriving output signals associated with a shadow being incident on the phototransistors associated therewith.

8. The apparatus of claim 6 wherein the logic circuit means includes means responsive to the output of each driver transistor for preventing the derivation of data pulses in response to the outputs of both driver transistors being associated with optical energy from the source means being incident on both of the phototransistors.

9. The apparatus of claim 6 wherein the logic circuit means includes means responsive to the output of each driver transistor for preventing the derivation of data pulses in response to the outputs of any of: either of the phototransistors having an excessively high emitter collector current when no optical energy is incident thereon, and either of the driver transistors having a short circuited emitter collector path.

10. The apparatus of claim 6 wherein the logic circuit means includes an R-S flip-flop having first and second inputs respectively responsive to outputs of the first and second driver transistors so that a pair of like binary levels are simultaneously derived by said flip-flop in response to the first and second driver transistors both simultaneously deriving outputs associated with no optical energy being incident on the first and second phototransistors and different binary levels are derived by said flip-flop in response to all other combinations of the outputs of the first and second driver transistors, a binary level comparator responsive to the outputs of the flip-flop for deriving an output signal having first and second different binary values in response to the outputs of the flip-flop being respectively the same and different, and first and second gate circuits respectively having first inputs responsive to outputs of the flip-flop; each gate circuit having a second input responsive to the output signal of the comparator, the gate circuits being of the type for deriving a first binary signal value in response to the first and second inputs thereof simultaneously having the same first level and for deriving a second binary signal level in response to the first and second inputs thereof simultaneously having different levels and the same second level.

11. Apparatus for deriving pulses indicative in number to the movement of a shaft comprising first and second optical sources, first and second optical energy detectors respectively responsive to energy from the first and second sources, an encoder disc adapted to be mounted for movement with the shaft, the encoder disc including plural relatively narrow substantially equi-spaced and equi-length arcuate opaque regions spaced from each other by relatively wide substantially equi-spaced and equi-length arcuate transparent regions so that as the encoder disc turns in response to turning of the shaft, optical energy from the first and second sources is prevented from reaching the first and second detectors by the narrow regions to cast shadows on the detectors and optical energy from the first and second sources is incident on the first and second detector via paths including the wide regions, the sources, detectors and regions being positioned such that under normal operation optical energy from the first and second sources is always incident on at least one of the first and second detectors at a particular time and is incident on both of the detectors at other times, the wide regions having an extent sufficiently great to prevent them from being clogged by dirt and other debris.

12. The apparatus of claim 11 further including circuit means responsive to pulses derived by the detectors in response to movement of the disc causing optical energy from the first and second sources to be incident on the detectors and to be blocked from the detectors, said circuit means including means for deriving an indication that the apparatus has failed in response to both of the detectors simultaneously deriving signals indicative of no optical energy from the source means being incident thereon.

13. The apparatus of claim 12 wherein the circuit means further includes means responsive to pulses derived by at least one detector for deriving data pulses to be accummulated to indicate the turning extent of the shaft, and means for preventing coupling of the data pulses in response to the indication that the apparatus has failed.

14. The apparatus of claim 13 wherein the means for preventing coupling data pulse includes non-resettable blocking circuit means.

15. The apparatus of claim 11 wherein each detector includes a phototransistor having an emitter collector path, the emitter collector paths being connected in parallel between a pair of power supply terminals and having a common collector load resistor connected to one of the power supply terminals so that the emitter collector voltages of both paths remain relatively low under normal operation even when one of the phototransistors has a high emitter collector impedance in response to said one transistor not being illuminated by optical energy from the source means, and a separate emitter output circuit for each of said phototransistors for deriving a signal indicative of the amount of optical energy incident on the respective phototransistor.

16. The apparatus of claim 15 further including a separate common emitter driver transistor respectively responsive to current coupled to each emitter output circuit, wherein the indication deriving means includes logic circuit means responsive to an output of each driver circuit for deriving the failure indication in response to any of: a failure of either of the sources, either of the phototransistors being open circuited, and either of the driver transistors being open circuited.

17. The apparatus of claim 16 wherein the logic circuit means includes means for deriving the failure indication in response to the driver transistors simultaneously deriving output signals associated with a shadow being incident on the phototransistors associated therewith.

18. The apparatus of claim 16 wherein the logic circuit means includes means responsive to the output of each driver transistor for preventing the derivation of data pulses in response to the outputs of both driver transistors being associated with optical energy from the source means being incident on both of the phototransistors.

19. The apparatus of claim 16 wherein the logic circuit means includes means responsive to the output of each driver transistor for preventing the derivation of data pulses in response to the outputs of any of: either of the phototransistors having an excessively high emitter collector current when no optical energy is incident thereon, and either of the driver transistors having a short circuited emitter collector path.

20. The apparatus of claim 16 wherein the logic circuit means includes an R-S flip-flop having first and second inputs respectively responsive to outputs of the first and second driver transistors so that a pair of like binary levels are simultaneously derived by said flip-flop in response to the first and second driver transistors both simultaneously deriving outputs associated with no optical energy being incident on the first and second phototransistors and different binary levels are derived by said flip-flop in response to all other combinations of the outputs of the first and second driver transistors, a binary level comparator responsive to the outputs of the flip-flop for deriving an output signal having first and second different binary values in response to the outputs of the flip-flop being respectively the same and different, and first and second gate circuits respectively having first inputs responsive to outputs of the flip-flop; each gate circuit having a second input responsive to the output signal of the comparator, the gate circuits being of the type for deriving a first binary signal value in response to the first and second inputs thereof simultaneously having the same first level and for deriving a second binary signal level in response to the first and second inputs thereof simultaneously having different levels and the same second level.

21. Apparatus for deriving pulses indicative in number of the movement of a mechanical member in response to pulses derived by a pair of detectors responsive to energy from an optical energy source means propagating through an encoder transducer adapted to be mounted for movement with the member, the encoder transducer including plural relatively narrow substantially equi-spaced and equi-length regions spaced from each other by relatively wide substantially equi-spaced and equi-length regions so that as the encoder transducer moves in response to movement of the member, optical energy from the source means is prevented from reaching the detectors by the narrow regions to cast shadows on the detectors and optical energy from the source means is incident on the detector via a path including the wide regions, the detectors and regions being positioned and the field of view of the detectors in response to the optical energy of the source means being such that under normal operation optical energy from the source means is always incident on at least one of the detectors at a particular time and is incident on both of the detectors at other times, the wide regions having an extent sufficiently great to prevent them from being clogged by dirt and other debris, the apparatus comprising: circuit means responsive to pulses derived by the detectors in response to movement of the transducer causing optical energy from the source means to be incident on the detectors and to be blocked from the detectors, said circuit means including means for deriving an indication that the apparatus has failed in response to both of the detectors simultaneously deriving signals indicative of no optical energy from the source means being incident thereon.

22. Apparatus for deriving pulses indicative in number to the movement of a mechanical member mechanically coupled for movement with an encoder transducer adapted to be mounted for movement with the member, the encoder transducer including plural relatively narrow substantially equi-spaced and equi-length regions spaced from each other by relatively wide substantially equi-spaced and equi-length regions, the apparatus comprising optical energy source means, a pair of detectors for energy from the source means, the source means, detectors and encoder transducer being such that as the encoder transducer moves in response to movement of the member optical energy from the source means is prevented from reaching the detectors by the narrow regions to cast shadows on the detectors and optical energy from the source means is incident on the detector via a path including the wide regions, the detectors and regions being positioned and the field of view of the detectors in response to the optical energy of the source means being such that under normal operation optical energy from the source means is always incident on at least one of the detectors at a particular time and is incident on both of the detectors at other times, the wide regions having an extent sufficiently great to prevent them from being clogged by dirt and other debris, each detector including a phototransistor having an emitter collector path, the emitter collector paths being connected in parallel between a pair of power supply terminals and having a common collector load resistor connected to one of the power supply terminals so that the emitter collector voltages of both paths remain relatively low under normal operation even when one of the phototransistors has a high emitter collector impedance in response to said one transistor not being illuminated by optical energy from the source means, and a separate emitter output circuit for each of said phototransistors for deriving a signal indicative of the amount of optical energy incident on the respective phototransistor.

23. The apparatus of claim 22 further including a logic circuit means responsive to an output of each output circuit for deriving a failure indication in response to any of: a failure of the optical energy source means, and either of the phototransistors being open circuited.

24. The apparatus of claim 23 wherein the logic circuit means includes means for deriving the failure indication in response to the output circuits simultaneously deriving output signals associated with a shadow being incident on the phototransistors associated therewith.

25. The apparatus of claim 23 wherein the logic circuit means includes means responsive to the output of each output circuit for preventing the derivation of data pulses in response to the outputs of either of the phototransistors having an excessively high emitter collector current when no optical energy is incident thereon.

26. The apparatus of claim 23 wherein the logic circuit means includes an R-S flip-flop having first and second inputs respectively responsive to outputs of the output circuits so that a pair of like binary levels are simultaneously derived by said flip-flop in response to the output circuits both simultaneously deriving outputs associated with no optical energy being incident on the first and second phototransistors and different binary levels are derived by said flip-flop in response to all other combinations of the outputs of the output circuits, a binary level comparator responsive to the outputs of the flip-flop for deriving an output signal having first and second different binary values in response to the outputs of the flip-flop being respectively the same and different, and first and second gate circuits respectively having first inputs responsive to outputs of the flip-flop; each gate circuit having a second input responsive to the output signal of the comparator, the gate circuits being of the type for deriving a first binary signal value in response to the first and second inputs thereof simultaneously having the same first level and for deriving a second binary signal level in response to the first and second inputs thereof simultaneously having different levels and the same second level.

* * * * *